(No Model.) 2 Sheets—Sheet 1.

F. DÜHRKOP.
BAKER'S OVEN.

No. 525,736. Patented Sept. 11, 1894.

Witnesses:
John Becker
William Schultz

Inventor.
Fritz Dührkop
by his attorneys
Roeder & Briesen (No Model.) F. DÜHRKOP. 2 Sheets—Sheet 2.
BAKER'S OVEN.
No. 525,736. Patented Sept. 11, 1894.
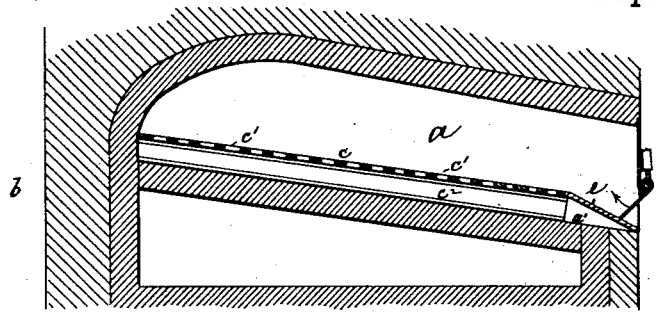
FIG. 4.
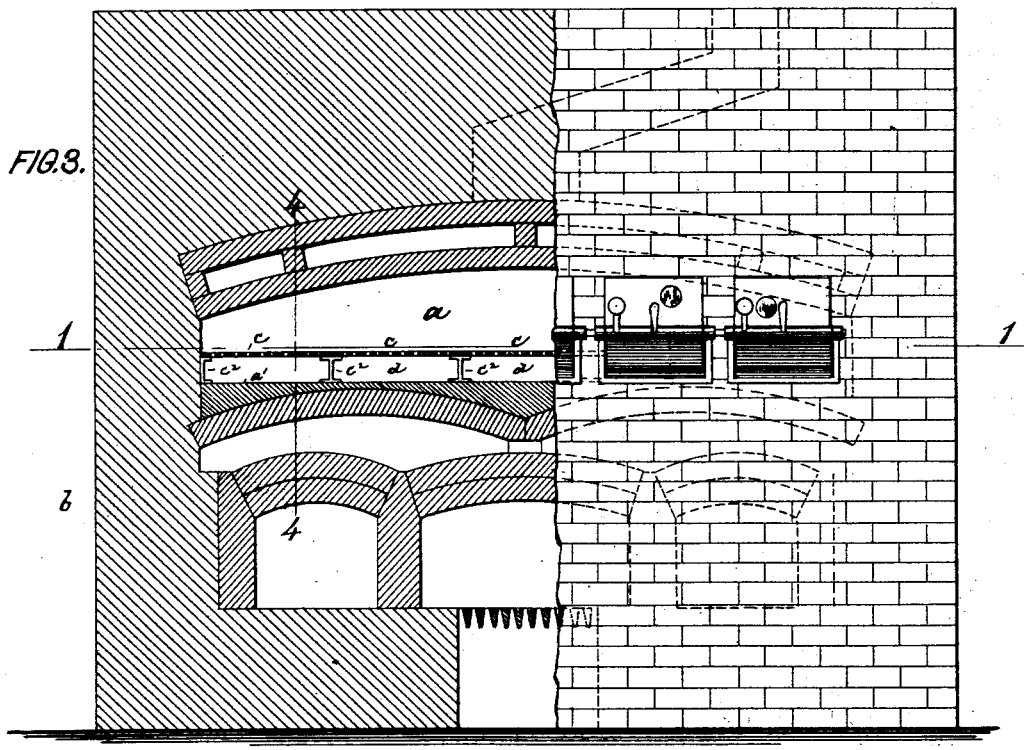
FIG. 3.
FIG. 5.
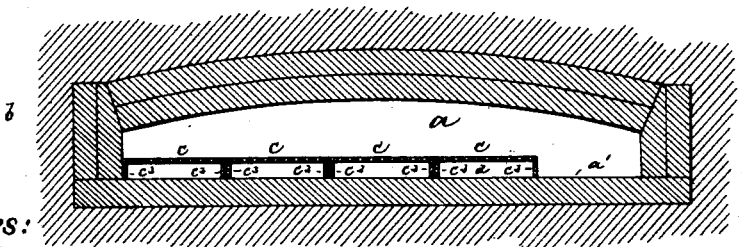
Witnesses:
John Becker
William Schutz
Inventor:
Fritz Dührkop
by his attorneys
Roeder & Brieson

UNITED STATES PATENT OFFICE.

FRITZ DÜHRKOP, OF NEW YORK, N. Y.

BAKER'S OVEN.

SPECIFICATION forming part of Letters Patent No. 525,736, dated September 11, 1894.

Application filed May 31, 1894. Serial No. 512,986. (No model.)

*To all whom it may concern:*

Be it known that I, FRITZ DÜHRKOP, of New York city, New York, have invented an Improved Baker's Oven, of which the following is a specification.

This invention relates to a baker's oven so constructed that any suitable inscription or design, such as the baker's name or trademark will be formed, by the baking operation, upon the lower side of the bread or roll.

Figure 1:
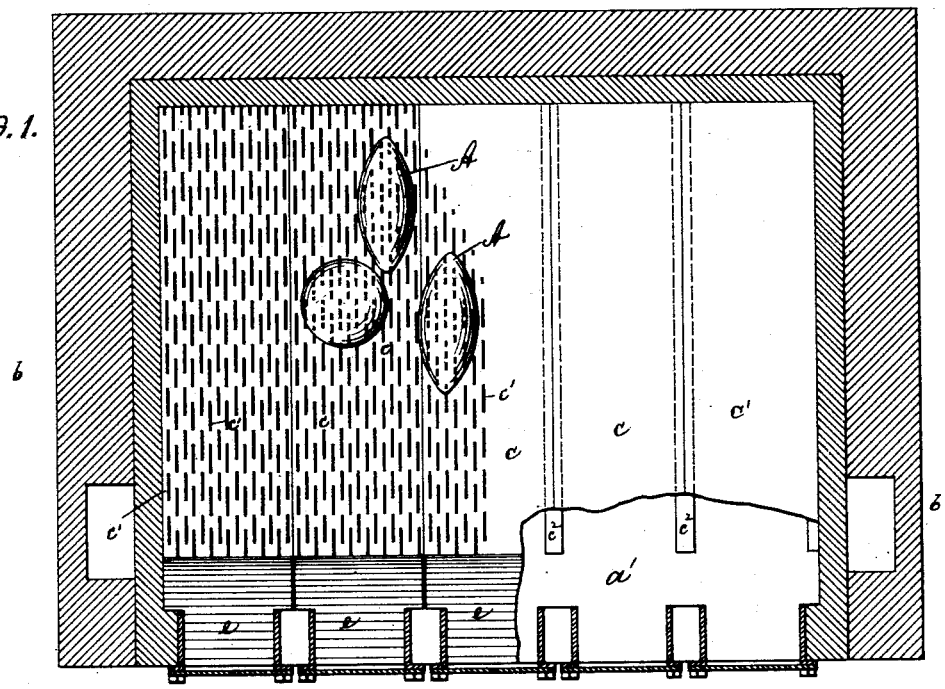
Figure 2:
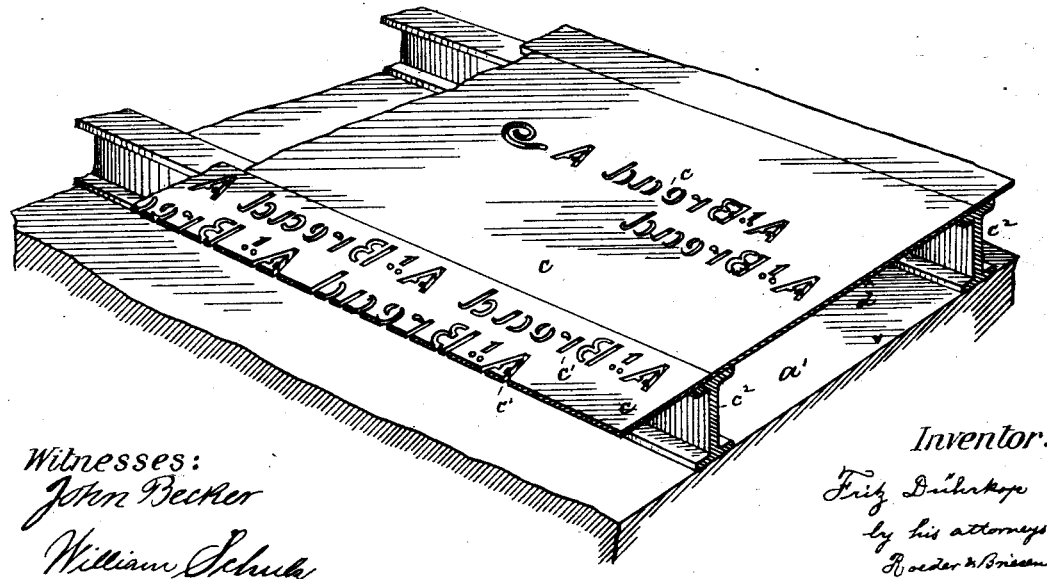

In the accompanying drawings: Figure 1 is a horizontal section of my improved baker's oven on line 1, 1, Fig. 3. Fig. 2 is a detail perspective view of the perforated false bottom; Fig. 3, a front elevation, partly in section of the oven; Fig. 4, a vertical longitudinal section on line 4, 4, Fig. 3, and Fig. 5 a vertical transverse section of a modification of the oven.

The letter $a$, represents the baking chamber of an oven $b$, heated in any suitable manner. Upon the sole $a'$, of chamber $a$, there is supported, at a short distance above such sole, a false bottom $c$, which is perforated to constitute a stencil plate. The patterns $c'$, cut through this plate form any suitable trademark, name or design to be represented upon the bread. I prefer to form the false bottom $c$, of a series of sections, which may be separately removed, when the oven is to be cleaned. The plates $c$, are supported either by the girders $c^2$, (Fig. 2,) or by flanges $c^3$, formed by turning the two sides of the plates downward (Fig. 5).

In use the dough loaves or rolls A are placed upon the false bottom $c$, and the baking takes place in the usual manner. The steam heat of the oven will pass through those openings $c'$, which are uncovered and into the chamber $d$, which is formed between the false bottom $c$, and the sole $a'$. Thus the exposed portions of the dough will become glossed or browned, while the protected sections will assume the usual dull and pale appearance. As a result, the pattern represented on the stencil plate will be reproduced upon the finished bread or rolls, without injuring the dough, soiling the oven or interfering with the baking operation.

Inclined guides $e$, should lead from the oven doors to the front ends of the plates $c$, (Fig. 4) to constitute proper approaches.

What I claim is—

A baker's oven provided with a false bottom above the oven sole, to form a lower steam chamber and a direct support for the dough loaves, and which is provided with a series of perforations that constitute a steam passage between the upper and lower chamber, substantially as specified.

FRITZ DÜHRKOP.

Witnesses:
   WM. SCHULZ,
   F. V. BRIESEN.